Figure 1A:
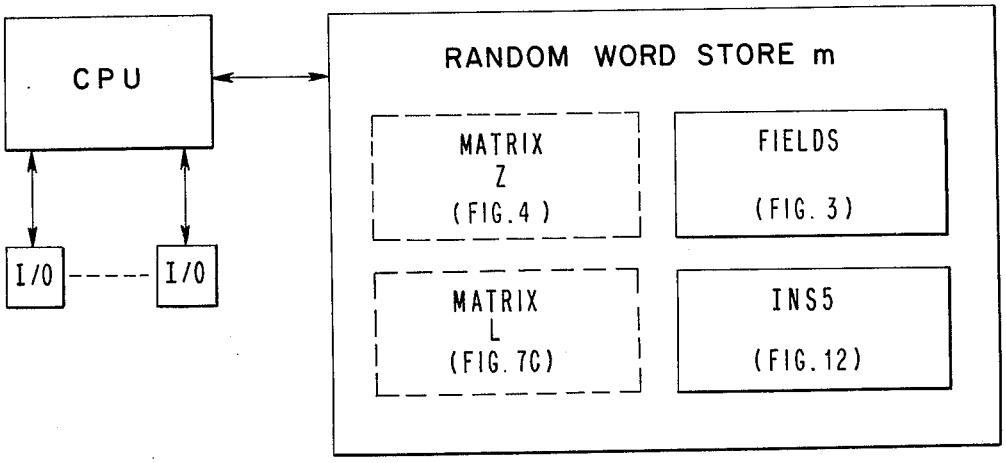
Figure 1B:
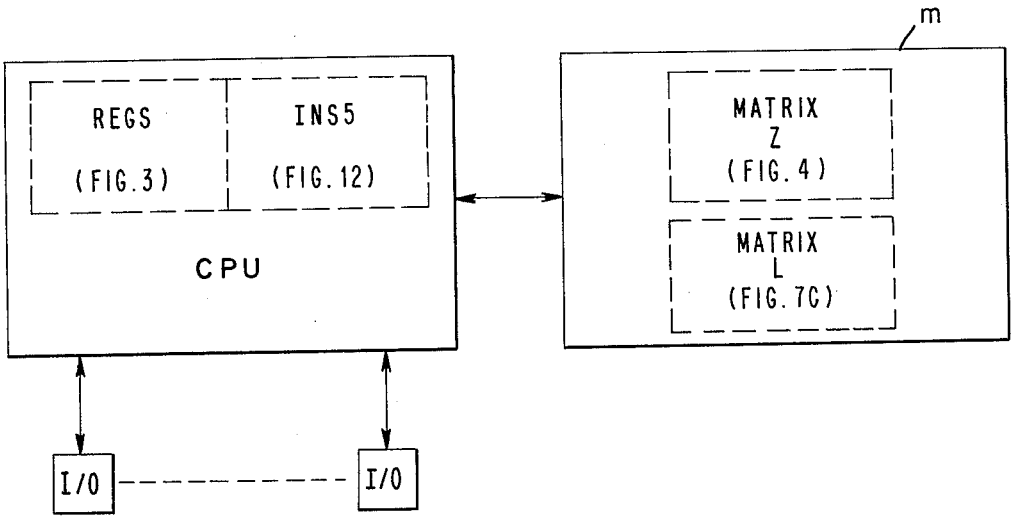
Figure 5A:
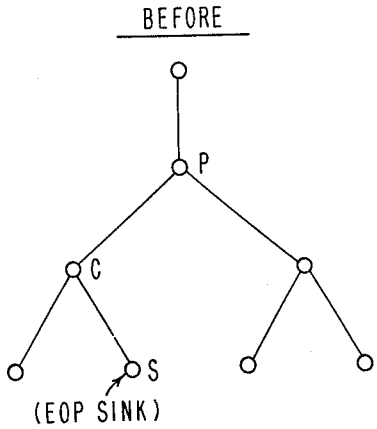
Figure 5B:
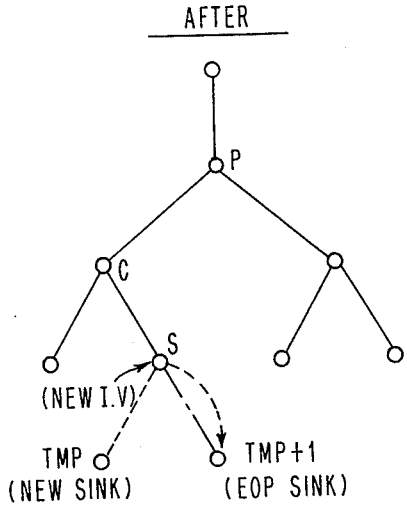
Figure 6:
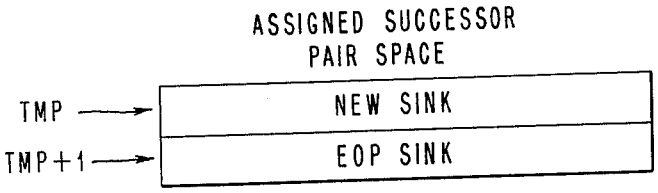

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 2, 1976

944 O.G. 40

T944,002

END-OF-PATH INSERTION SYSTEM

Luther Jay Woodrum, Poughkeepsie, N.Y., assignor to International Business Machines Corporation, Armonk, N.Y.

Continuation of application Ser. No. 415,085, Nov. 12, 1973, which is a continuation of abandoned application Ser. No. 203,573, Dec. 1, 1971. This application Sept. 30, 1974, Ser. No. 510,811

Int. Cl. G06f *13/00, 13/06*

U.S. Cl. 444—1

12 Sheets Drawing. 41 Pages Specification

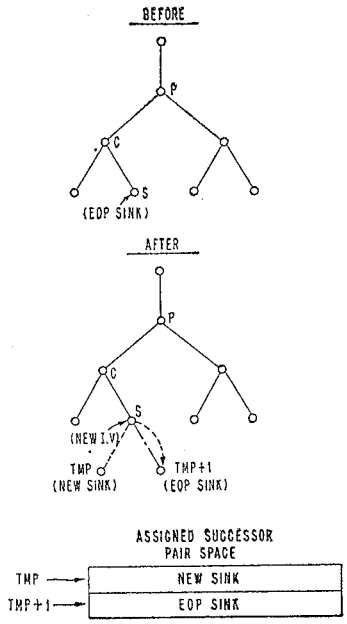

Electronically generating and inserting each entry always at the end of a path in a binary tree directory. Each new insertion entry directly displaces an existing sink found by a search of the directory with a search argument (which may be an input key). The input sequence of search arguments may be unsorted. The ascending (descending) path property is not used in a directory constructed with this invention. As a result, there is no sorted relationship among the sinks contained within this directory as occurs, on the other hand, when generating or inserting into directories constructed with the inventions using the ascending path property in prior related applications having Ser. Nos. 136,902 and 136,951 filed Apr. 23, 1971, by the same inventor as the subject application. The end-of-path insertion location is found using the search method invention in prior application Ser. No. 136,686 filed Apr. 23, 1971 by the same inventor. The inner vertices in this directory may contain edges having the absolute, offset, or invertible form.

FIG. 2A

| BIT 0 | BIT 1 | | BIT (m-2) | BIT (m-1) |
|---|---|---|---|---|

KEY FORMAT (VARIABLE LENGTH)

FIG. 2B

| K[0] | K[1] | K[2] | | K[n] |
|---|---|---|---|---|

INPUT SEQUENCE OF KEYS

FIG. 3

| | FIELD/REGS | |
|---|---|---|
| DAR | ADDRESS OF DIRECTORY | |
| P | PREDECESSOR VERTEX ADDRESS | |
| C | CURRENT VERTEX ADDRESS | |
| S | SUCCESSOR VERTEX ADDRESS | |
| KEY0 | LENGTH | END-OF-PATH KEY |
| ADR0 | ADDRESS OF END-OF-PATH RECORD | |
| KEY1 | LENGTH | CURRENT INPUT KEY |
| I | CURRENT L INDEX OF KEY1 | |
| D | NEW D-INDEX | |
| BIT | VALUE OF BIT AT D-INDEX IN KEY1 | |
| TMP | TEMPORARY REGISTER | |
| ALT | ADDRESS OF NEW LOCATION FOR EOP SINK | |
| SNK | ADDRESS OF NEW SINK ROW | |

FIG. 4

MATRIX Z

| ADDRESS IN M | # SINKS FIELD | | | SPACE CHAIN FIELD | | |
|---|---|---|---|---|---|---|
| DAR+0 | 0 | 1 | 2 | 3 | 4 | 5 |
| DAR+1 | D | $t_0$ | $c_0$ | $t_1$ | $c_1$ | ± EDGE |
| ⋮ | ⋮ | ⋮ | ⋮ | ⋮ | ⋮ | ⋮ |
| TMP | | | | | | |
| TMP+1 | | | | | | |
| ⋮ | ⋮ | ⋮ | ⋮ | ⋮ | ⋮ | ⋮ |
| DAR+(2N-1) | | | | | | |

NOTE:

TMP IS ROW ADDRESS FOR LEFT SUCCESSOR AND TMP+1 IS ROW ADDRESS FOR PAIRED RIGHT SUCCESSOR IN ASSIGNED SUCCESSOR PAIR SPACE.

N IS MAXIMUM NUMBER OF SINKS IN MATRIX Z

MATRIX L

| I | INPUT KEY | I/O RECORD ADDRESS |
|---|---|---|
| 0 | K16 | R16 |
| 1 | K6 | R6 |
| 2 | K30 | R30 |
| 3 | K14 | R14 |
| 4 | K20 | R20 |
| 5 | K12 | R12 |
| 6 | K32 | R32 |
| 7 | K4 | R4 |
| 8 | K0 | R0 |
| 9 | K26 | R26 |
| 10 | K2 | R2 |
| 11 | K8 | R8 |
| 12 | K22 | R22 |
| 13 | K10 | R10 |
| 14 | K34 | R34 |
| 15 | K28 | R28 |
| 16 | K24 | R24 |
| 17 | K18 | R18 |

Figure 7A:
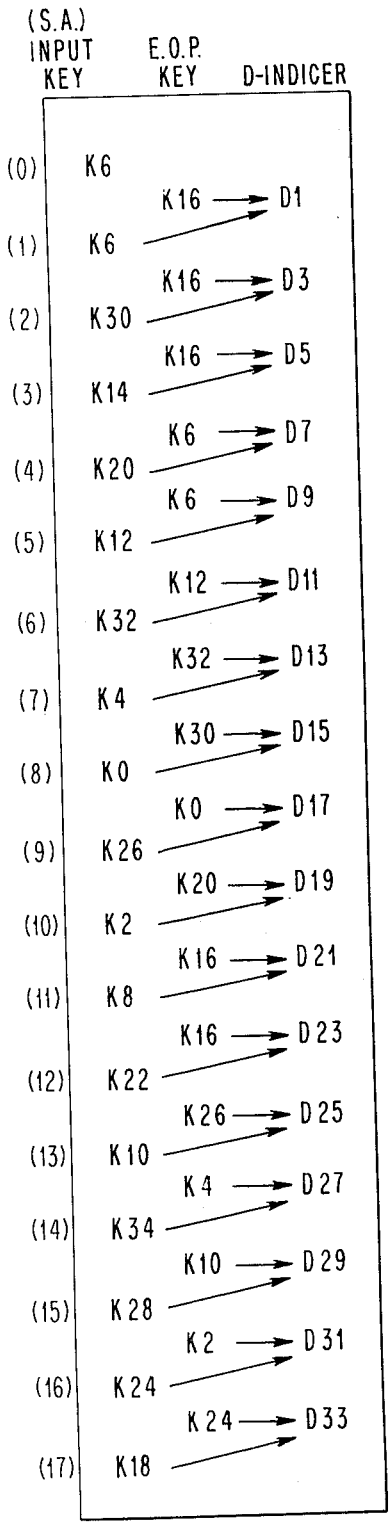
Figure 7B:
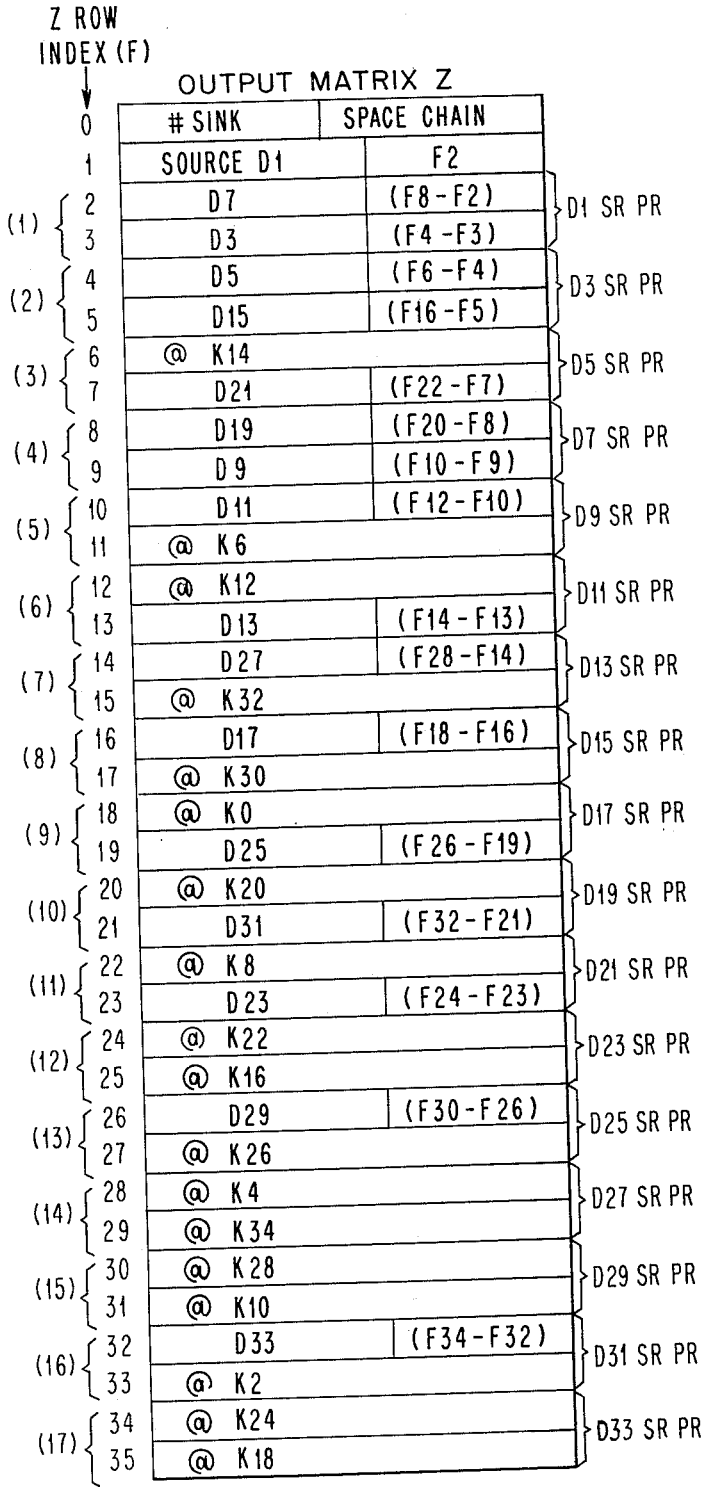
Figures 7C, 8A:
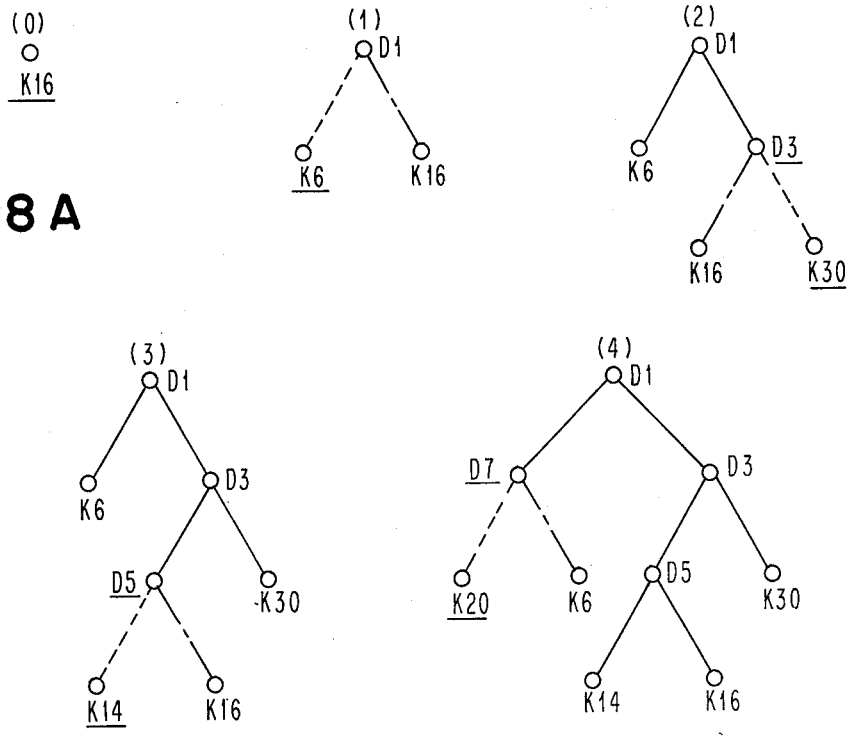
Figure 8B:
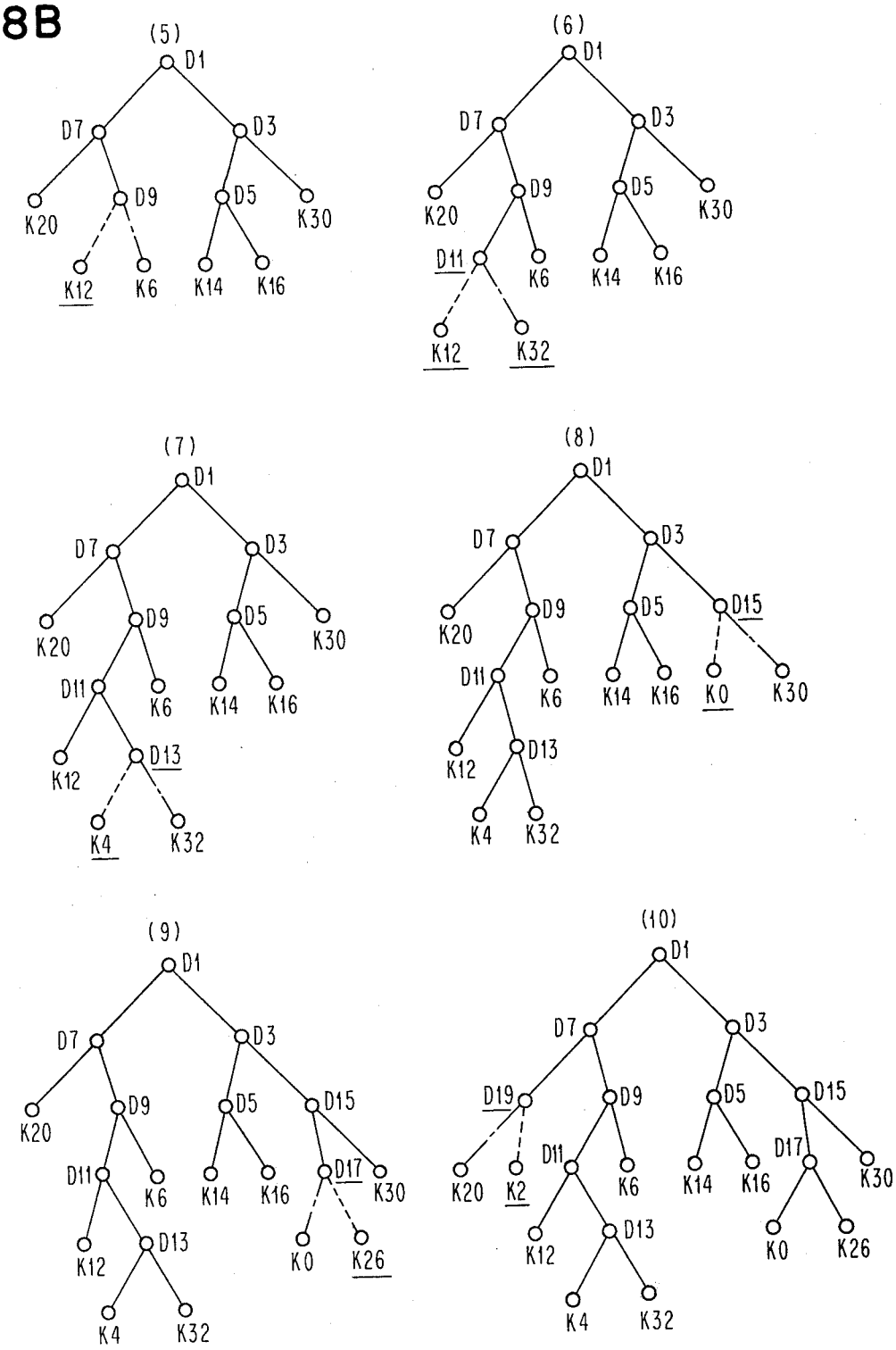
Figure 8D:
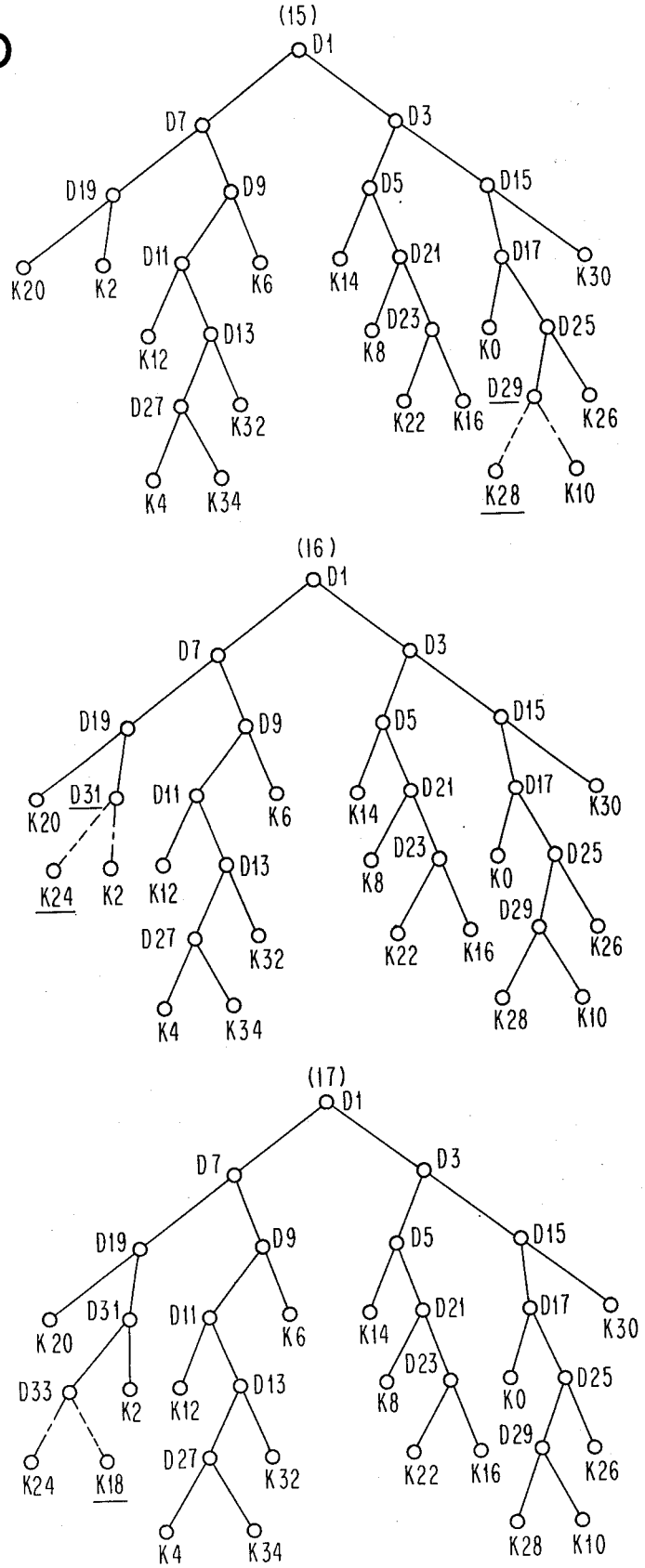
Figure 9:
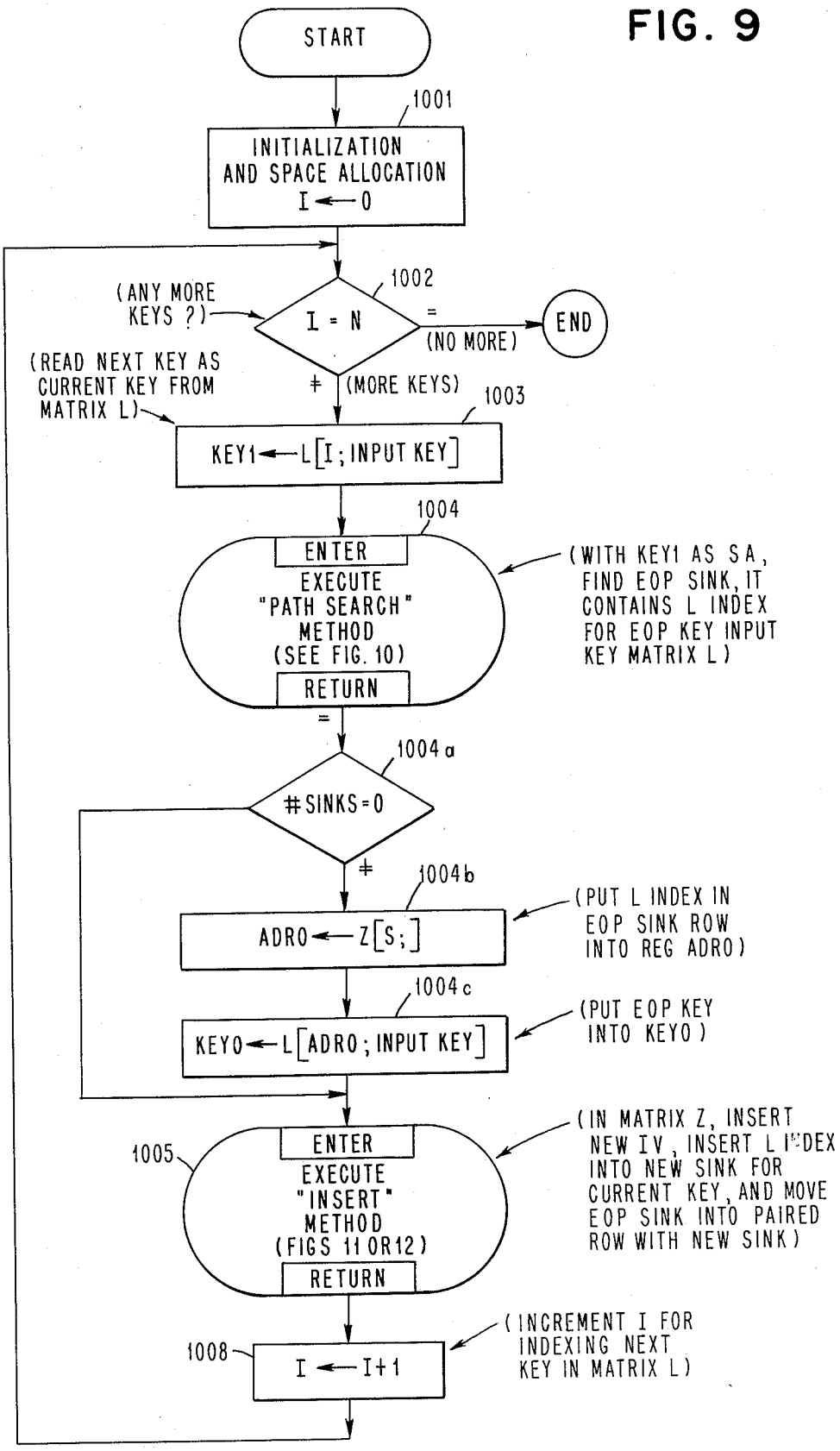
Figure 10:
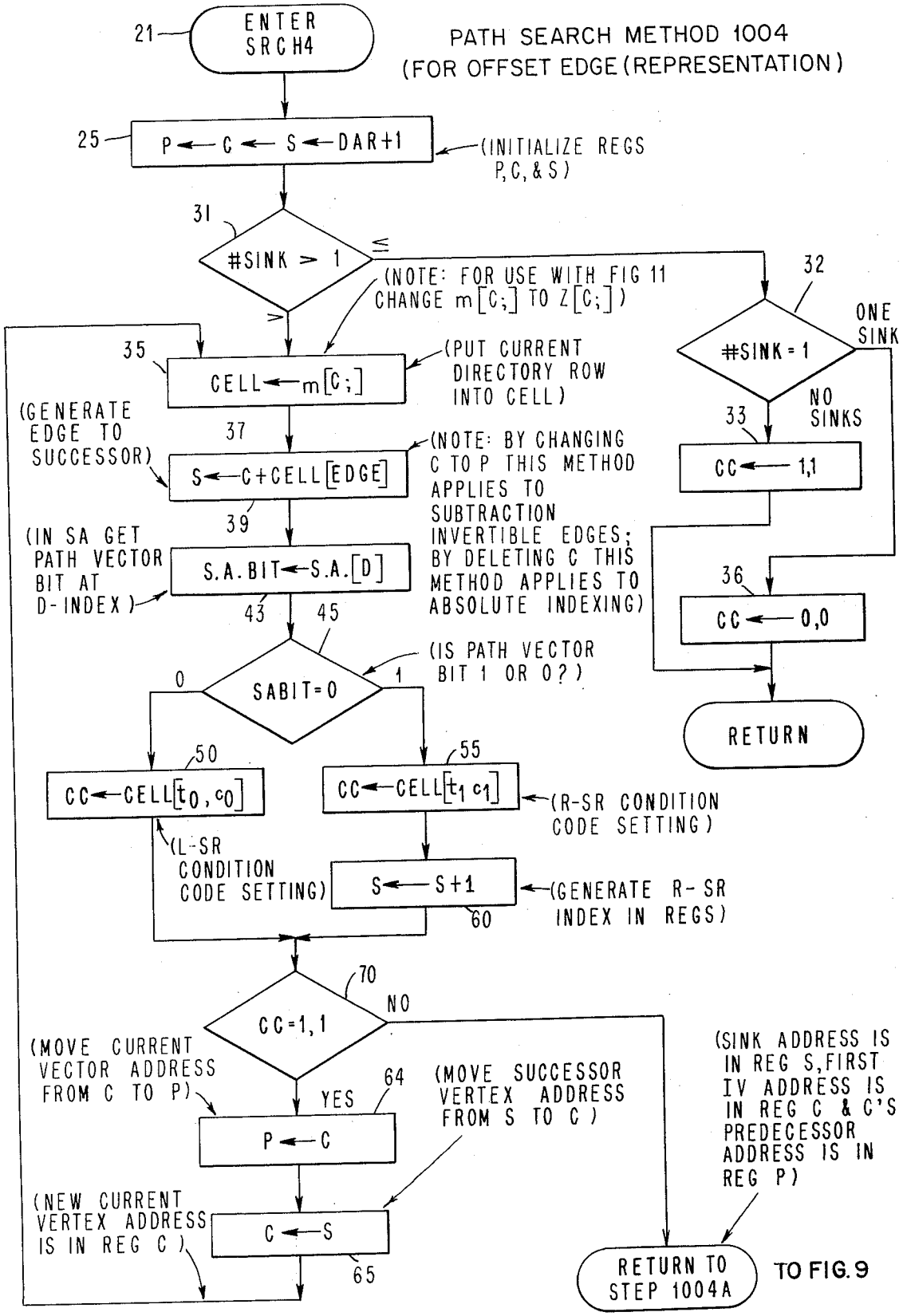
Figure 11:
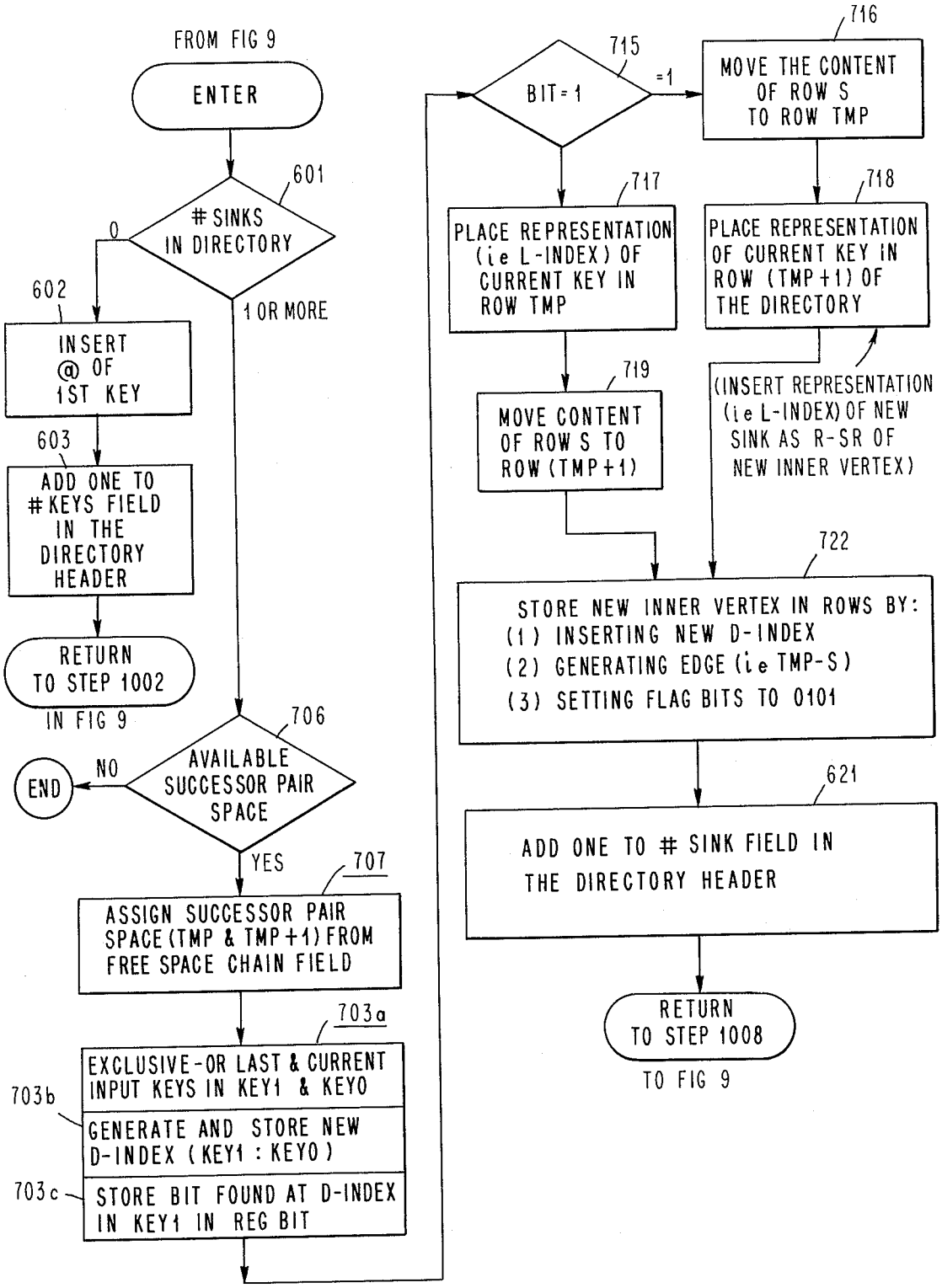
Figure 12:
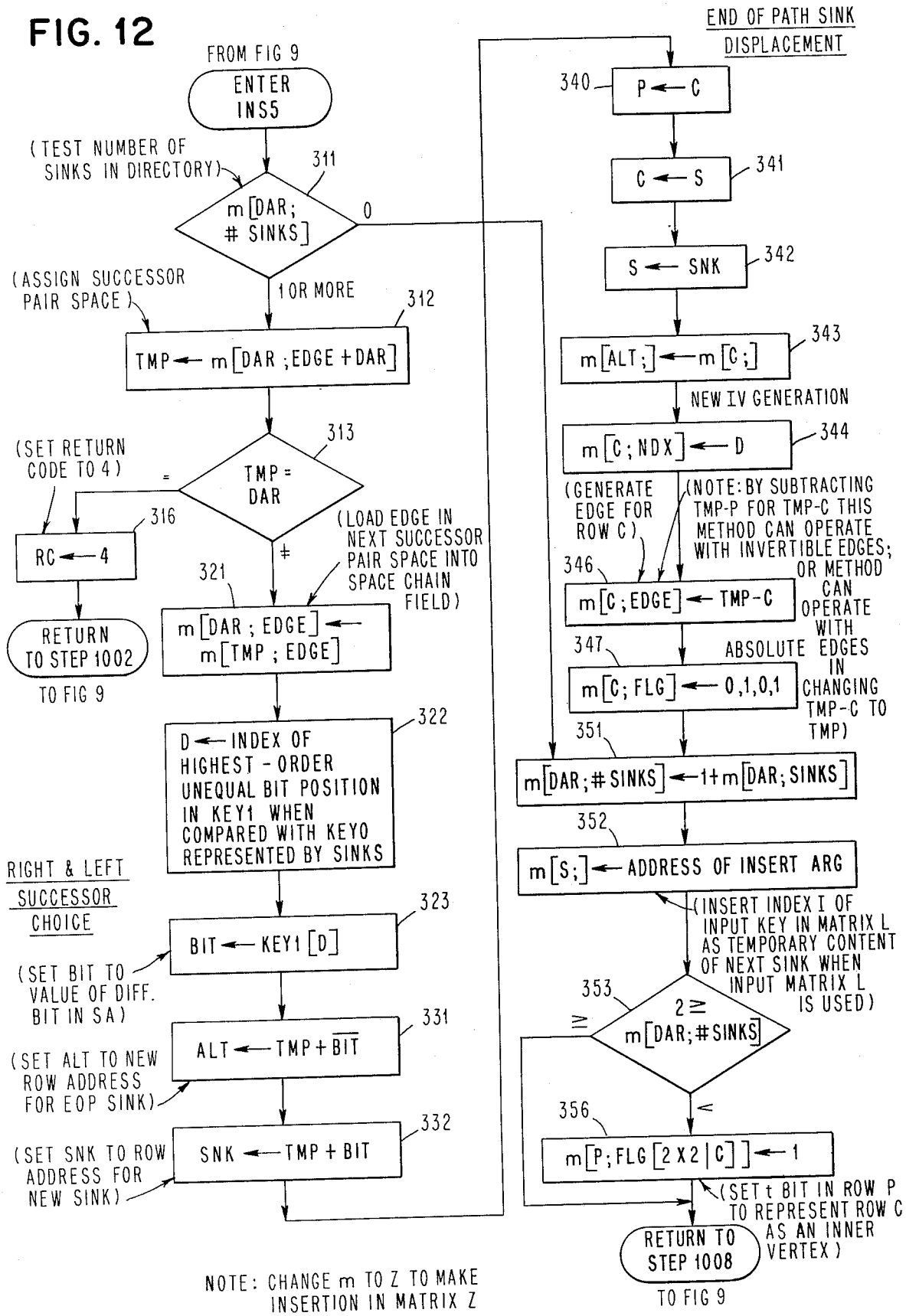

FIG. 8C
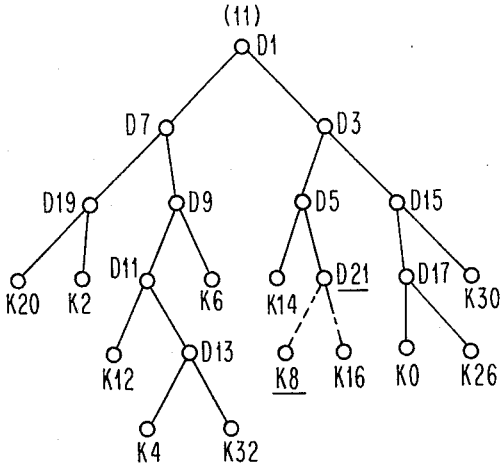
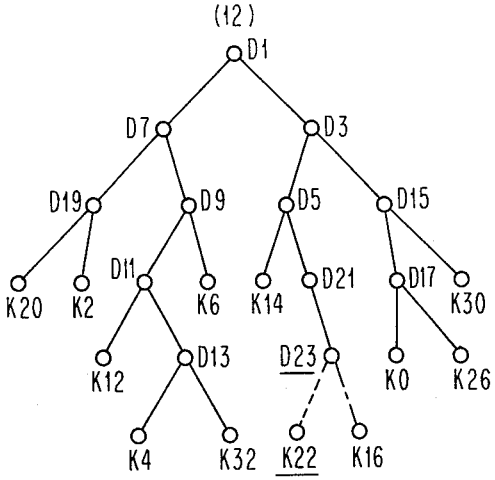
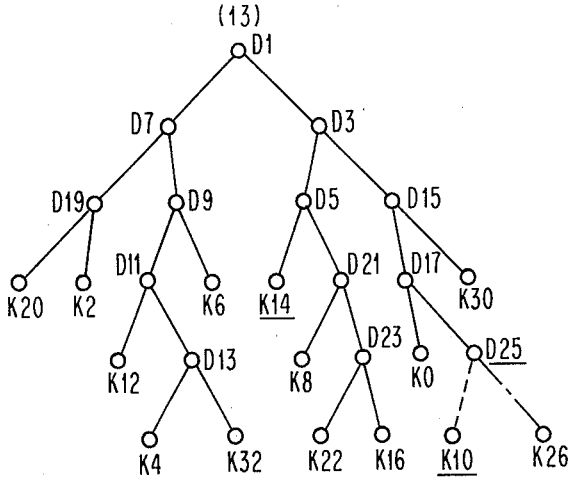
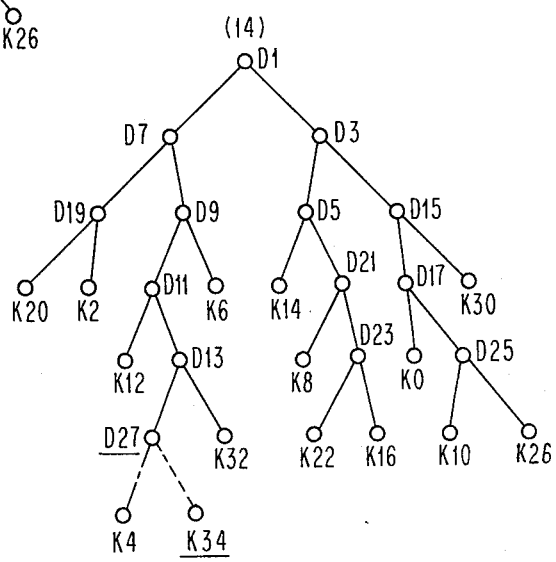

FIG. 11 (END-OF-PATH INSERT METHOD-1)

NOTE: CHANGE m TO Z TO MAKE INSERTION IN MATRIX Z